United States Patent [19]
Salter

[11] 3,833,194
[45] Sept. 3, 1974

[54] PIPE SUPPORTS
[75] Inventor: Anthony John Salter, Woodsetton, England
[73] Assignee: Pipe Supports Limited, Tividale, Warley, Worcester, England
[22] Filed: Dec. 20, 1972
[21] Appl. No.: 316,817

[30] Foreign Application Priority Data
Jan. 4, 1972  Great Britain .................. 225/72

[52] U.S. Cl. .......................... 248/54 CS, 248/58
[51] Int. Cl. ............................... F16l 3/00
[58] Field of Search ......... 248/54 CS, 58; 74/813 L, 74/527, 530, 516, 518; 192/4 A

[56] References Cited
UNITED STATES PATENTS

| | | | |
|---|---|---|---|
| 2,726,621 | 12/1955 | Hill | 74/530 UX |
| 2,975,995 | 3/1961 | Sherburne | 248/54 CS |
| 3,167,285 | 1/1965 | Suozzo | 248/54 CS |
| 3,194,523 | 7/1965 | Wright et al. | 248/54 CS |
| 3,661,403 | 5/1972 | Path | 74/813 L X |

FOREIGN PATENTS OR APPLICATIONS
1,240,670  7/1971  Great Britain .................. 248/54 CS

*Primary Examiner*—Roy D. Frazier
*Assistant Examiner*—Rodney H. Bonck
*Attorney, Agent, or Firm*—Merriman, Marshall, Shapiro & Klose

[57] ABSTRACT

The specification discloses a constant tension pipe support comprising a lever pivoted to a frame and which may be locked in any one of a number of positions by engaging teeth on the lever with teeth on a locking member slidable between operative and inoperative positions, interengaging guide means being provided on the locking member and the support frame substantially to prevent rotation of the locking member in both its operative and inoperative positions.

4 Claims, 4 Drawing Figures

PATENTED SEP 3 1974  3,833,194
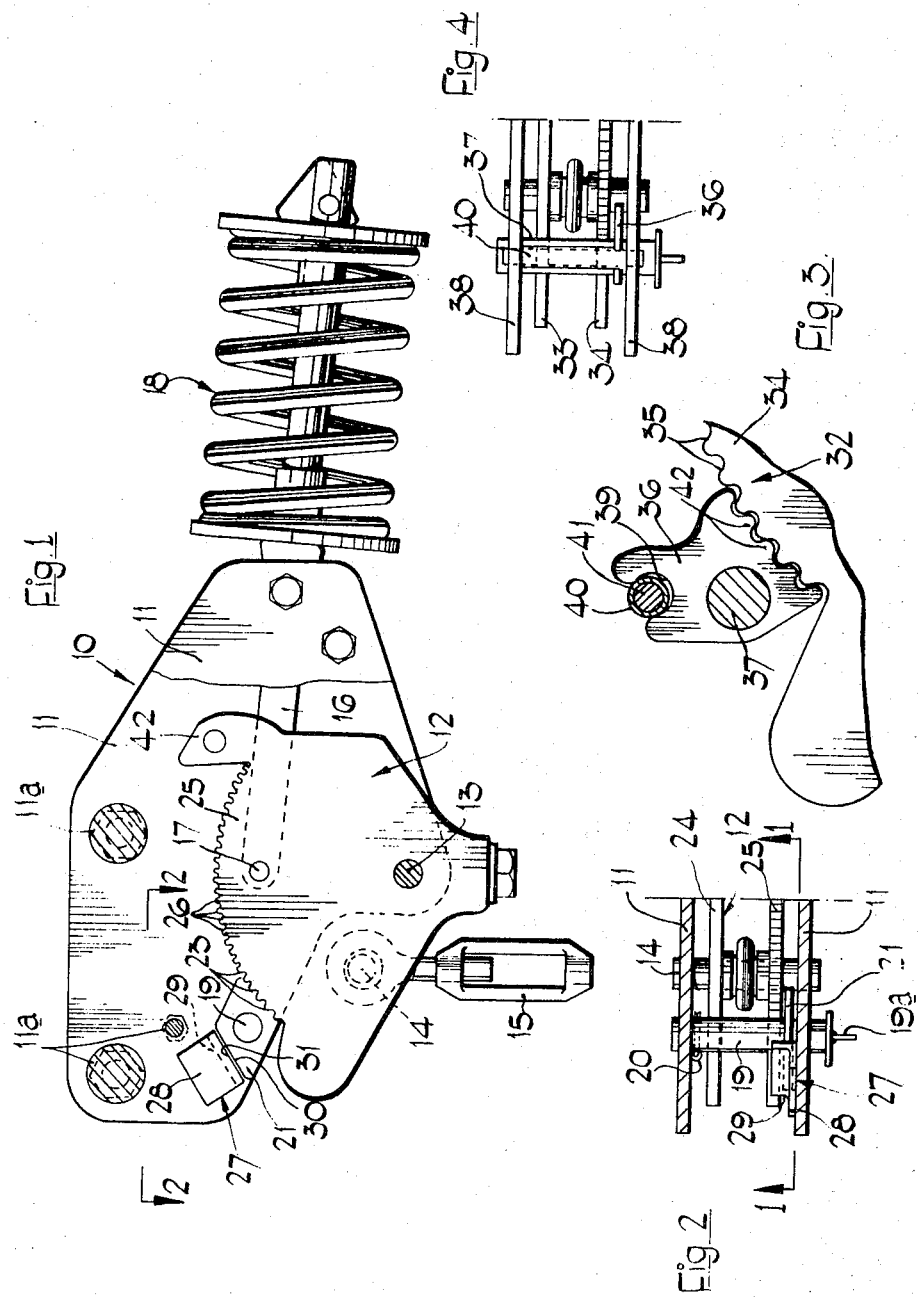

PIPE SUPPORTS

BACKGROUND OF THE INVENTION

1. Field of the Invention

This invention relates to pipe supports comprising a lever pivoted to a support frame, spring means acting on the lever and means for attaching a load to the lever to be supported by the spring means.

2. Description of the Prior Art

When such pipe supports are in use they support pipes which normally carry steam. The pipe supports are arranged so that as the pipes expand and contract the pipes are supported by a substantially constant load. It is necessary from time to time to clean the pipes and for this purpose acid is circulated through them. It will be appreciated that the load on the supports when the pipes are full of acid is considerably greater than the load on the supports when the pipe is full of steam and normally the supports are locked during cleaning so that the acid load is not supported by the spring means. The normal arrangement for locking the supports is to provide complementary holes in the lever and the support frame through which a pin, the so called "acid pin", may be passed to lock the lever in position on the support frame during cleaning. Such a pin arrangement, however, only gives one position in which the lever can be locked and this may, in certain circumstances, be disadvantageous.

It is an object of the present invention to provide a pipe support having a simple and secure means for locking the lever in any one of a number of positions.

SUMMARY OF THE INVENTION

According to the invention we provide a pipe support comprising a support frame; a lever pivoted to the frame; spring means connected between the frame and the lever to urge the latter in one sense about its pivot; means for attaching a load to the lever so that the load will urge the lever in the other sense about its pivot; the lever having a series of teeth thereon located in an arc about the lever pivot axis; a toothed locking member mounted on the frame for slidable movement parallel to said axis between an operative position in which the teeth on the lever and the locking member interengage to prevent pivotal movement of the lever and an inoperative position in which said teeth are out of engagement and pivoting of the lever is permitted; and interengaging guide means on the locking member and the support frame substantially to prevent rotation of the locking member in both its operative and inoperative positions.

The guide means which prevent rotation of the locking member give freedom in the possible design of locking formations since these need not be designed to prevent rotation of the locking member when engaged with the locking formations on the lever.

Preferably the support frame includes spaced frame plates between which the lever is pivoted and the locking member comprises a shaft slidably mounted in the frame plates and carrying a toothed locking dog, the locking dog and the support frame having the interengaging guide means.

Said guide means may comprise an abutment extending between the frame plates and a recess in the locking dog and slidably engaging said abutment.

Alternatively the guide means may comprise a bracket secured to one of the frame plates and arranged to engage the locking dog. In this arrangement the bracket and the locking dog may have planar, interengaging surfaces.

In either arrangement the lever may be provided with an abutment which engages the shaft at one end of the range of pivotal movement of the lever.

Two embodiments of the invention will now be described in detail by way of example with reference to the accompanying drawings in which:

BRIEF DESCRIPTION OF THE DRAWINGS

FIG. 1 is a side sectional elevation of a pipe support constituting a first embodiment of the invention on the line 1—1 of FIG. 2;

FIG. 2 is a fragmentary plan view of the support of FIG. 1 on the line 2—2 of FIG. 1;

FIG. 3 is a detail view showing part of a lever and a locking dog of a second embodiment of the invention; and FIG. 4 is a fragmentary plan view of the support of FIG. 3.

DESCRIPTION OF THE PREFERRED EMBODIMENT

Referring now to FIGS. 1 and 2, part of the support frame of the pipe support is indicated generally at 10 and includes two spaced side plates 11 which are interconnected by spacers 11a. Mounted between the side plates is a load lever indicated generally at 12 which is pivoted about a horizontal axis on a pin 13. The lever is generally triangular in shape and it will be seen that the pin 13 is adjacent to one apex of the lever. Adjacent to another apex of the lever is provided a load pin 14 to receive a connection 15 for a load. A link 16 is pivoted to the lever at 17 and is connected to spring means 18. The spring means 18 will support a load attached to the connection 15 and the geometry of the support is such that the lever may pivot about the pin 13 as the load moves while supporting the load with a substantially constant force.

Slidable in the frame side plates 11 is a shaft 19 which is provided at one end with a handle 19a and has adjacent its other end a hole to receive a split pin 20. Welded to the shaft 19 is a dog 21 provided at one end with teeth 23 as clearly shown in FIG. 1.

The lever 12 comprises two plates 24, 25 as shown in FIG. 2 and which are connected together by means not shown. Along the edge of the plate 24 remote from the pivot pin 13 there are provided a plurality of teeth indicated generally at 26. The teeth 26 are arranged in a circular arc about the axis of the pin 13. The teeth 23 and 26 are of complementary shape so that the teeth 23 can fit into the teeth 26 as shown in FIG. 1.

Welded to one of the frame side plates 11, the lower plate in FIG. 2, is a guide indicated generally at 27. The guide is of L-shape in cross-section and has a first flange 28 which is welded to the side plate 11 and a second flange 29 which projects at right angles from the side plate 11 and has a planar guide surface 30. The dog 21 is of generally rhombus shape in side elevation as shown in FIG. 1 and its upper surface 31 is planar and engages the planar guide surface 30 of the guide 27.

In FIG. 2, the locking member constituted by the shaft 19 and the dog 21 is shown in its inoperative position, that is to say the dog is out of alignment with the plate 25. The locking member is held in its inoperative position by the split pin 20.

When it is desired to lock the lever 12 in a given position for cleaning of the pipe supported thereby, the pin 20 is removed and the shaft 19 is moved upwardly in FIG. 2 so as to bring the teeth 23 on the dog 21 into engagement with selected teeth of the teeth 26 on the plate 25. When the teeth 23 and 26 are engaged the lever 11 is locked in position and the split pin 20 can be reinserted into the hole in the shaft 19 so that the pin is above the upper plate 11 in FIG. 2 and holds the locking member in its engaged position. Since there are more teeth 26 on the plate 24 than there are teeth 23 on the dog 21 the lever may be locked in any one of a number of positions depending on which of the teeth on the lever are engaged by the teeth 23.

There will be a tendency for the load and/or the spring means acting on the lever 12 to rotate the shaft 19 due to engagement of the teeth 23 and 26 but this rotation is substantially prevented by the engagement of the planar surface 30 on the guide 27 with the upper surface 31 on the dog 21.

Referring now to FIGS. 3 and 4, these show part of an embodiment of the invention in which the interengaging guide means are arranged somewhat differently from those in FIGS. 1 and 2 where they are provided by the guide or bracket 27 and the planar face 31 on the locking dog 21.

In FIGS. 3 and 4, part of a lever is shown at 32 and comprises two plates 33 and 34 which are interconnected by means not shown. The means for attaching a load to the lever is as described in relation to FIGS. 1 and 2. The plate 34 has an arcuate series of teeth 35 arranged circumferentially around the lever pivot. A locking dog 36 is mounted on a shaft 37 which is slidable in side plates 38 of the frame of the support all in a manner similar to the mounting of the shaft 19 in FIGS. 1 and 2. In FIGS. 3 and 4, however, the locking dog is provided with a recess 39 in which is received a tubular spacer 40 and a bolt 41 which extend between the frame side plates 38. The interengaging guide means are therefore provided by the recess 39 and the abutment constituted by the tubular spacer 40 and the bolt 41. The locking dog has teeth 42 which may engage with the teeth 35 or as described in relation to FIGS. 1 and 2.

In either embodiment, the lever may have an abutment as indicated at 42 in FIG. 1 at the third apex triangle and at the limit of travel of the lever 12 in an anticlockwise direction and the abutment 42 engages the shaft 19 to prevent further movement of the lever.

It will be seen that the invention provides a simple arrangement of support in which the lever may be locked in any one of a number of desired positions with security.

I claim:

1. A pipe support comprising a support frame including spaced frame plates; a lever pivoted to the frame between said frame plates, spring means connected between the frame and the lever to urge the latter in one sense about its pivot; means for attaching a load to the lever so that the load will urge the lever in the other sense about its pivot; the lever having a series of teeth thereon located in an arc about the lever pivot axis; a toothed locking member mounted on the frame for slidable movement parallel to said axis between an operative position in which the teeth on the lever and the locking member interengage to prevent pivotal movement of the lever and an inoperative position in which said teeth are out of engagement and pivoting of the lever is permitted, the locking member comprising a shaft slidably mounted in the frame plates and carrying a toothed locking dog; and interengaging guide means on the locking dog and the support frame substantially to prevent rotation of the locking member in both its operative and inoperative positions.

2. A pipe support according to claim 1 wherein the interengaging guide means comprise an abutment extending between the frame plates and a recess in the locking dog and slidably engaging said abutment.

3. A pipe support according to claim 1 wherein the interengaging guide means comprise a bracket secured to one of the frame plates and arranged to engage the locking dog.

4. A pipe support according to claim 3 wherein the bracket and the locking dog have planar, interengaging surfaces.

* * * * *